A. B. BURGER.
BICYCLE LOCK.
APPLICATION FILED JUNE 5, 1917.
1,270,690.
Patented June 25, 1918.
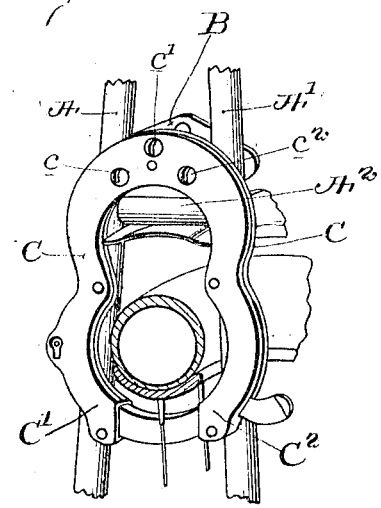
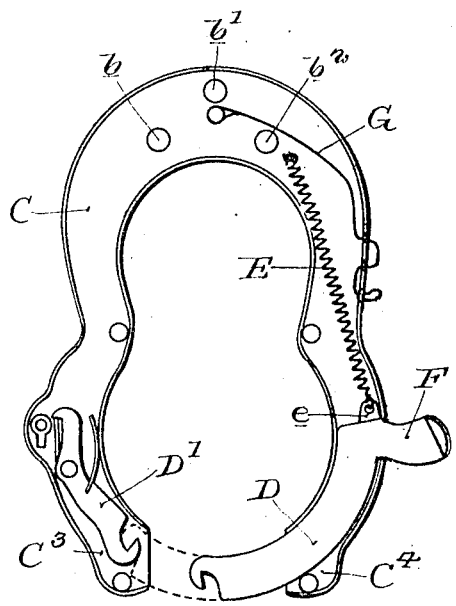
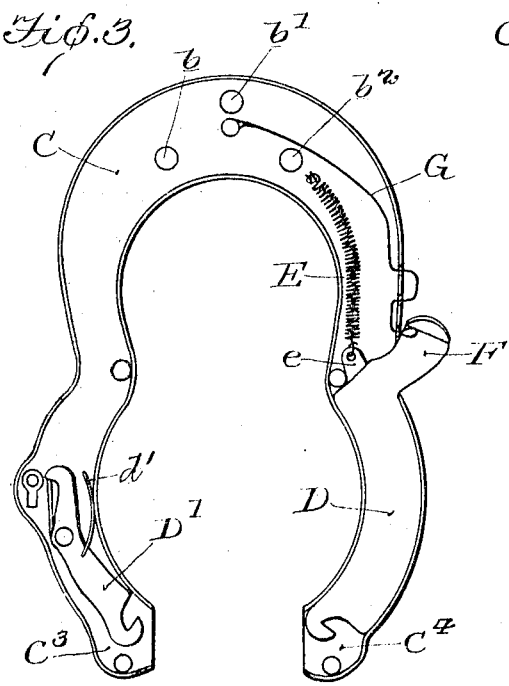
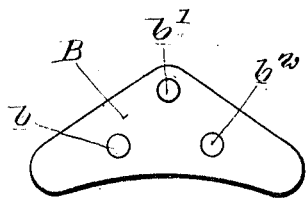
Inventor
A. B. Burger
By William H. Bates
Attorney

UNITED STATES PATENT OFFICE.

ABRAHAM B. BURGER, OF PORTLAND, OREGON.

BICYCLE-LOCK.

1,270,690.            Specification of Letters Patent.   Patented June 25, 1918.

Application filed June 5, 1917. Serial No. 172,961.

*To all whom it may concern:*

Be it known that I, ABRAHAM B. BURGER, citizen of the United States, residing at Portland, in the county of Multnomah and State of Oregon, have invented certain new and useful Improvements in Bicycle-Locks, of which the following is a specification.

My invention has relation to bicycle locks and it has for its object to improve, simplify and cheapen the cost of construction of this class of locks, and the invention consists in the novel construction and combination of parts, as will be hereinafter more in detail described, and the asserted novelty specifically claimed.

I have fully and clearly illustrated my invention in the accompanying drawings, in which:

Figure 1 represents a perspective elevation of the bicycle clutch lock when secured to a portion of a bicycle frame, the lock being shown closed and encircling a mud-guard or shield, and a portion of a bicycle tire, and rim.

Fig. 2 represents a sectional plan view of the lock, the dotted lines showing the same closed.

Fig. 3 represents a similar enlarged view showing the lock open, and

Fig. 4 represents a view of a substantially triangular plate which connects the lock to the bicycle frame portion.

Similar letters of reference indicate corresponding parts in the several figures.

A, A', A² designate the portion of a bicycle frame to which a clutch lock is rigidly secured and which is to be located below the bicycle seat through the medium of a substantially triangular plate B having therein perforations $b$, $b'$, $b^2$, and through which are passed screws $c$ $c'$, $c^2$ through alined openings formed in the two sections of said clutch-lock, which will be hereinafter described.

C, C designates a metallic clutch-lock, composed of two legged sections C', C², C³, C⁴, which are channeled out and secured together and to the frame portion of the bicycle by means of the plate B and screws or bolts hereinbefore referred to. These channels which are formed in the two legged sections C', C², C³, C⁴ of the clutch lock C, C have the configuration of a yoke, and when the two legged sections are secured together register with each other, and serve to house suitable operative mechanism composed of a shackle member D in the lower end of one of the channeled legs of the lock and in the opposite lower channeled leg of the lock is pivotally secured a dog D', the lower hooked end of which takes into the hooked lower end of the slidable member by which means the lock is locked and unlocked as occasion requires as clearly shown in Figs. 2 and 3.

E designates a coiled spring one end of said spring being secured to the inner surface of the upper portion of each section of the lock C, and the opposite end of said coiled spring is secured to lug $e$ on shackle member D.

One of the main features is the configuration of the lock provided with the upper and smaller opening in the yoke-like construction, which receives the mud-shield or guard of the bicycle, and which is designed to fit any kind of mud-shield. Formed integrally with the shackle D, is a thumb-piece or lever F.

G, designates a spring which is secured to the upper and inner surfaces of the lock and located over the upper ends of the coiled spring, one end of the spring being secured to each section of the lock by means of screws or any suitable fastening means, the opposite ends of said spring being passed through openings formed in one side and near the upper ends of the lock sections and suitably looped upon the outer sides of said sections to receive the thumb-piece or lever F. A suitable key (not shown in the drawing) is employed for locking and unlocking the mechanism, and which can be used only by persons understanding how to operate it. Special importance is attached to this spring G, which receives the thumb-piece or lever by which the shackle D, or member is raised and held in position by the looped ends of said spring G. The free ends of the spring G extend outwardly through openings in the sides of the legs of the lock and hold the lever of the shackle D.

The larger and lower openings of the lock where the wheel runs through, encircles the tire and the rim when the bicycle clutch lock is open for traveling. When the wheel is to be locked, the thumb-piece or lever F, formed upon the larger shackle D, is pushed down, throwing said shackle across the lower opening of the lock, thereby closing it and securing it against theft, as hereinbefore stated. When it becomes necessary to use the bicycle, the key throws back dog D' thus releasing the shackle.

What I claim as new, and desire to secure by Letters Patent is:

The combination of a bicycle lock casing formed in two sections, a shackle member slidably seated in the lower portion of the channeled section and provided with an integrally formed handle and lug integrally formed on said handle, a coiled spring having its ends secured to the lock and lug, a lock spring having one end secured to the upper portion of a lock and the free ends thereof passed through openings formed in the side of the lock in looped formation by which the handle is held in a raised position, a dog pivotally secured to, and seated in the opposite and lower portion of the lock casing, a small bowed spring interposed between the dog and the lock casing substantially as herein shown and described.

In testimony whereof I affix my signature.

ABRAHAM B. BURGER.

Copies of this patent may be obtained for five cents each, by addressing the "Commissioner of Patents, Washington, D. C."